United States Patent [19]

Hardesty

[11] 4,158,322
[45] Jun. 19, 1979

[54] PYROTECHNIC SEPARATION DEVICE

[75] Inventor: Thomas K. C. Hardesty, Ednor, Md.

[73] Assignee: The United States of America as represented by the Secretary of the Navy, Washington, D.C.

[21] Appl. No.: 826,509

[22] Filed: Aug. 22, 1977

[51] Int. Cl.² .................. F16K 17/40; F42B 22/00
[52] U.S. Cl. .................................................. 89/1 B
[58] Field of Search ............... 89/1 B, 1 R; 102/49.5; 60/632, 636, 637, 638; 85/DIG. 1

[56] References Cited

U.S. PATENT DOCUMENTS

| | | | |
|---|---|---|---|
| 3,087,369 | 4/1963 | Butterfield | 89/1 B X |
| 3,196,746 | 7/1965 | Dahl | 89/1 B |
| 3,200,706 | 8/1965 | Kinard | 89/1 B |
| 3,503,814 | 3/1970 | Helms | 149/109 |
| 3,530,759 | 9/1970 | Francis | 89/1 B X |
| 3,695,951 | 10/1972 | Helms et al. | 149/19 |
| 3,698,281 | 10/1972 | Brandt et al. | 89/1 B |
| 3,728,934 | 4/1973 | Palmer | 89/1 B |
| 3,890,174 | 6/1975 | Helms et al. | 149/144 |
| 3,983,392 | 10/1976 | Hardesty | 89/1 B |
| 3,994,201 | 11/1976 | Bendler et al. | 89/1 B |

Primary Examiner—David H. Brown
Attorney, Agent, or Firm—R. Sciascia; R. Beers; S. Sheinbein

[57] ABSTRACT

A combination gas generator and pyrotechnic separation device which causes a separation of elements safely, quietly, quickly, and without the production of loose parts or release of combustion gases to the ambient environment. A tubular tensile element houses a quantity of pyrotechnic material which, when ignited, burns, fuses or melts a tensile element allowing the separable elements to break apart. High pressure gases generated by the combustion of the pyrotechnic material aids in separating the separable elements.

13 Claims, 5 Drawing Figures

PYROTECHNIC SEPARATION DEVICE

BACKGROUND OF THE INVENTION

This invention relates to a separable element which can be severed instantaneously for various purposes. More particularly, it relates to a separable connecting element such as a pyrotechnic bolt-type fastener, which can be fused or melted with little or no noise and provides the capability of utilizing the pressure developed by the resultant heat and products of combustion to perform actuation of a device.

Severable elements which can fasten a plurality of items together, are widely used in connection with space missiles, rocket boosters, multi-stage rockets, commercial vehicles, cranes, ships, submersible mines and valves, and in other applications where instantaneous separation of two or more elements is required. Present explosive devices, and particularly explosive bolts, are subject to the disadvantages that the explosion separating or breaking them is accompanied by noise, shock, production of loose and flying parts and the expulsion of propellant gases into the system or into the atmosphere.

The noise and shock resulting in the escape of propellant by-products from the partially opened severable element is severe enough to disrupt electronic circuits, break communication lines, rupture liquid carrying pipes, causing malfunction or even failure of the device with which the explosive bolt is used. In the case of a flooding valve for a mine or other underwater device the noise produced by the shock waves would be highly deleterious in areas where detection by mine countermeasures would not be desired. The release of gaseous by-products into an ambient environment may also be objectionable in many space, surface and underwater devices as these by-products can contaminate the environs of the device and are capable of building up corrosive by-products on critical items such as wires, tubes, mirrors, electrical control mechanisms and other critical and sensitive elements.

Previous methods which have used detonating chemicals for actuation are typified by U.S. Pat. No. 3,530,759 to Francis, U.S. Pat. No. 3,254,555 to Joneikis, and U.S. Pat. No. 3,200,706 to Kinard. However, the detonating chemicals in Francis represents a safety hazard, particularly during storage, and in Joneikis and Kinard, the generation of actuation noise during detonation of an explosive charge is pronounced and unavoidable. Some methods, e.g., U.S. Pat. No. 3,728,934 to Palmer, have attempted to provide an irreversibly severable linkage which is fused or destroyed by a thermite mixing thus eliminating the use of detonating chemicals. Unfortunately, Palmer does not confine the products of combustion nor does he produce a motive fluid useful for doing work. Also, Palmer's design does not appear to readily lend itself to a system requiring relatively high tensile loads.

A requirement thus exists for a relatively strong low noise level means of quickly separating a fastener on electrical command which can also produce sufficient high pressure gas to perform actuation of a device. The present invention achieves all of these objectives while avoiding the deficiencies of the prior art mechanisms.

SUMMARY OF THE INVENTION

Accordingly, it is an object of the instant invention to provide a new and improved separable connection element.

Another object of the present invention is to provide a new and improved pyrotechnic separation means for actuating a mechanism at a low noise level.

An additional object of the instant invention is to provide a relatively strong pyrotechnic separation device which can quickly separate a bolt type fastener at low noise levels upon electrical command and additionally supply necessary motive fluid to perform actuation of a device.

A further object of the invention is to provide a pyrotechnic separation device which functions as a low noise level combination gas generator and separation device particularly suited for use as a means of actuating a mechanism such as a flood valve.

Yet another object of the invention is to provide a pyrotechnic separation device which is useful as a silent separation link.

According to one embodiment of this invention a pyrotechnic charge is disposed in a chamber formed in a fusible elongate tubular tensile element. The tensile element has means for attachment to at least two separable items and provides for the electrical actuation of the pyrotechnic charge. The pyrotechnic charge may comprise a combination of an exothermic mixture and a gas producing chemical. In use in a flood valve, a pressure cavity is defined between the valve housing and a sliding member which normally closes intake ports formed in the valve housing. The instant pyrotechnic separation device is fixed at one end to the valve housing and at its other end to the sliding member. Upon valve actuation, the pyrotechnic charge fuses or burns through the fusible elongate tubular tensile element and produces sufficient high pressure gas in the pressure cavity to force the sliding member to uncover the intake ports.

BRIEF DESCRIPTION OF THE DRAWINGS

A more complete understanding of the invention and a fuller appreciation of the many attendant advantages thereof will be derived by reference to the following detailed description when considered in connection with the accompanying drawings wherein.

DESCRIPTION OF THE PREFERRED EMBODIMENTS

Figure 1:
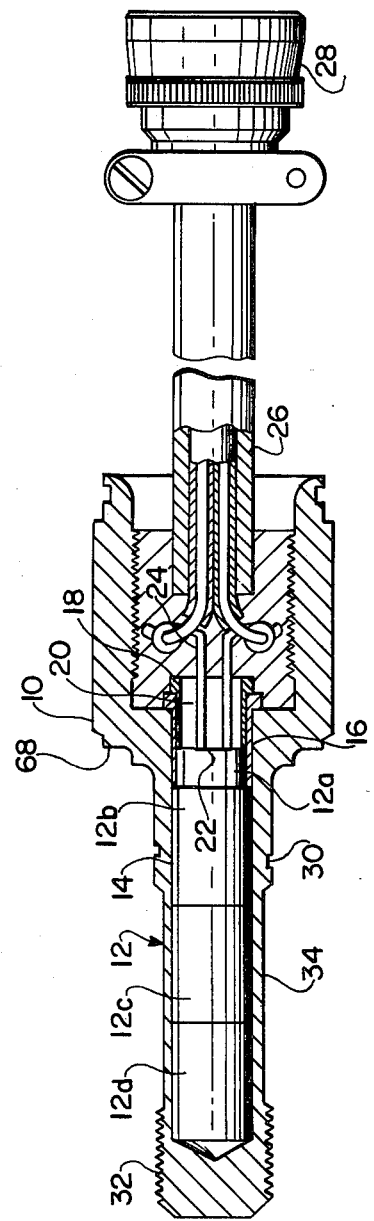
FIG. 1 is a sectioned view of a preferred embodiment of the pyrotechnic separation assembly of the present invention.

Referring now to the drawings wherein like reference characters designate identical or corresponding parts throughout the several views, and more particularly to FIG. 1 thereof, the instant pyrotechnic separation device, assembly, or bolt is shown as an elongate fusible tubular tensile element or housing 10 of non-uniform cross-section. The bolt is fabricated from a high strength material having suitable thermal and/or combustion characteristics such as glass, graphite, magnesium, aluminum or such materials that lose strength, melt or are combustible. A quantity of a pyrotechnic mixture 12 is disposed within a chamber 14 defined within the tubular housing. An ignition subassembly 16 seals off chamber 14 and comprises an ignition cup 18 fixing a plug 20 and a bridge wire 22 connected to firing cable leads 24. Firing cable leads 24 are encased in a flexible sheath 26 leading to an electrical connector 28 which communicates with a source of electrical energy (not shown). Upon actuation of the pyrotechnic separation assembly, sufficient electrical energy is supplied to bridge wire 22 via leads 24 to cause it to glow red hot and ignite the pyrotechnic mixture.

Arranged about housing 10 is a first means 30 for attachment to a first separable element. Such means could be a circumferential groove seating a retaining ring thereby fixing the housing to the first separable element as will subsequently be seen. Another portion of the bolt, e.g., surface 68 could be used additionally to bear against a surface of the first sparable element. At another end of housing 10, a bolt head 32 is provided for attachment to a second separable element. Bolt head 32 could be a threaded connection, as shown.

As was mentioned earlier a pyrotechnic mixture 12 is disposed within chamber 14. Pyrotechnic mixture 12 is preferably of the types described in the following U.S. patents granted to Helms Jr., et al: U.S. Pat. Nos. 3,695,951, issued Oct. 3, 1972 and 3,503,814, issued Mar. 3, 1970. The most preferred mixture is disclosed in U.S. Pat. No. 3,890,174 issued June 17, 1975 to Helms, Jr., et al. The basic pyrotechnic mixture desired in the present invention therefore will, upon ignition, evolve a great deal of heat and gas capable of doing work. These characteristics are obtained without the generation of noise-producing shock waves typical of detonating chamicals.

A standard array of mixture 12 would include an ignition mix 12a, an easily ignitable mix, which starts burning from a red-hot bridge wire 22. The ignition mix then ignites pyrotechnic mixture 12b which is loose but packed since if it was densely packed it might not light at all. Finally, pyrotechnic mixture 12b ignites compressed increments 12c, 12d of the pyrotechnic mixture which burn through a thin fusible wall 34 in the bolt shank of housing 10. Upon melting of the thin wall 34 the separable elements attached to the housing are released. The gases produced by the preferred pyrotechnic mixture are confined; the separable elements are not just allowed to separate but are in fact forced to separate but without the production of loose parts or a shock wave.

The bolt of FIG. 1 can be used in many areas where high tensile strength is needed despite the presence of thin wall section 34. Tests have shown that a bolt with such a hollow shank retains considerable strength. For instance, an aluminum alloy (e.g., alloy 7075-T6) bolt similar in design to that of FIG. 1 having a 5/16 inch outside diameter shank with a $\frac{1}{4}$ inch diameter bore (0.032 inch wall thickness at 34) can have a tensile yield strength of over 1900 pounds.

Figure 2:
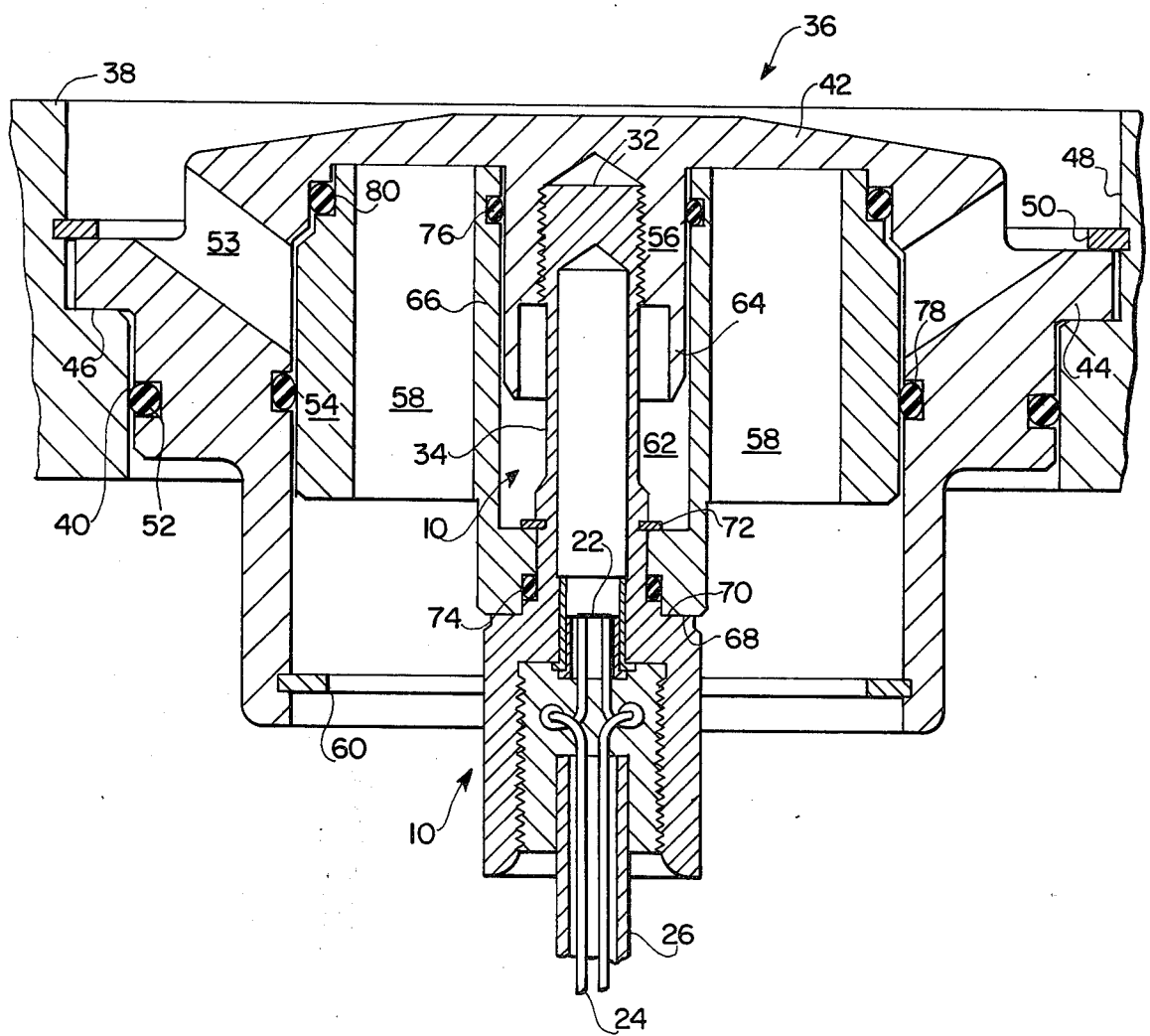
FIG. 2 shows a sectional view of the separation assembly used in an unactuated valve.

One example which utilizes the capabilities of the assembly to produce pressure developed by the resultant heat and gaseous products of combustion of the pyrotechnic mixtures to perform actuation of a device is shown in FIG. 2.

FIG. 2 shows a cross sectional view of a pyrotechnically actuated valve before actuation wherein the valve 36 is illustrated installed in a vessel 38, such as a submerged mine or buoy, which is to be subsequently flooded. Pyrotechnic valve 36, preassembled as a complete unit and installed within a receiving bore 40 in vessel 38, is shown to comprise an annular housing 42 having an outwardly extending circumferential flange 44 on its exterior surface bearing upon a supporting ridge 46 formed in bore 40 by a counterbore 48. A retaining ring 50 is received within a recess in bore 48 and engages the flange 44 to securely hold the valve assembly 36 within the vessel 38. An O-ring 52 provides a fluid seal between the valve and the vessel. Housing 42 has a plurality of intake ports 53 to permit fluid entry through the valve 36 after valve actuation.

Nestled within housing 42 is a generally cylindrical sliding member 54 which serves as a translatable obturator for intake ports 53. A center post 56, extending from housing 42, serves to guide sliding member 54 as it translates upon valve actuation. As shown in FIG. 2, member 54 closes off and seals intake ports 53 thereby precluding fluid entry through the valve until valve actuation (see FIG. 3) when fluid is allowed to flow into vessel 38 through ports 53 and thereafter through discharge ports 58, formed in the sliding member. A stop ring 60 limits the extent to which the sliding member can translate for a reason which will presently be understood.

A pressure cavity 62 is defined between an inverted cup 64 formed on a lower extremity of guide post 56 and the cylindrical wall of an interior tube 66 formed within member 54. This tube acts as a bearing surface for the sliding member and cooperates with post 56 in order to guide the translatable sliding member 54 after valve actuation.

Disposed within pressure cavity 62 and fixed at one end to housing 42 and at its other end to sliding member 54, is the pyrotechnic separation assembly or bolt of FIG. 1. Assembly 10 is fixed at end 32, e.g., by a threaded connection with post 56. Abutting surfaces 68 and 70 of assembly 10 and sliding member 54, respectively, in conjunction with a bolt head retaining ring 72 secure the assembly 10 with respect to the sliding member. In this fashion valve 36 is held in its unactuated state by the high tensile strength of the bolt.

Gas seals 74, 76 seal pressure cavity 62 both before and after actuation. O-ring seals 78, 80 lie substantially along the same surface which is equidistant from the centerline of the valve thus thereby making the valve as functionally insensitive to external hydrostatic pressure as the valves described in copending application Ser. No. 826,508 filed Aug. 22, 1977 to Hardesty. Thus, a minimum tensile load is imposed on bolt 10 thereby decreasing the need for bolts capable of resisting extremely high tensile loads.

Figure 3:
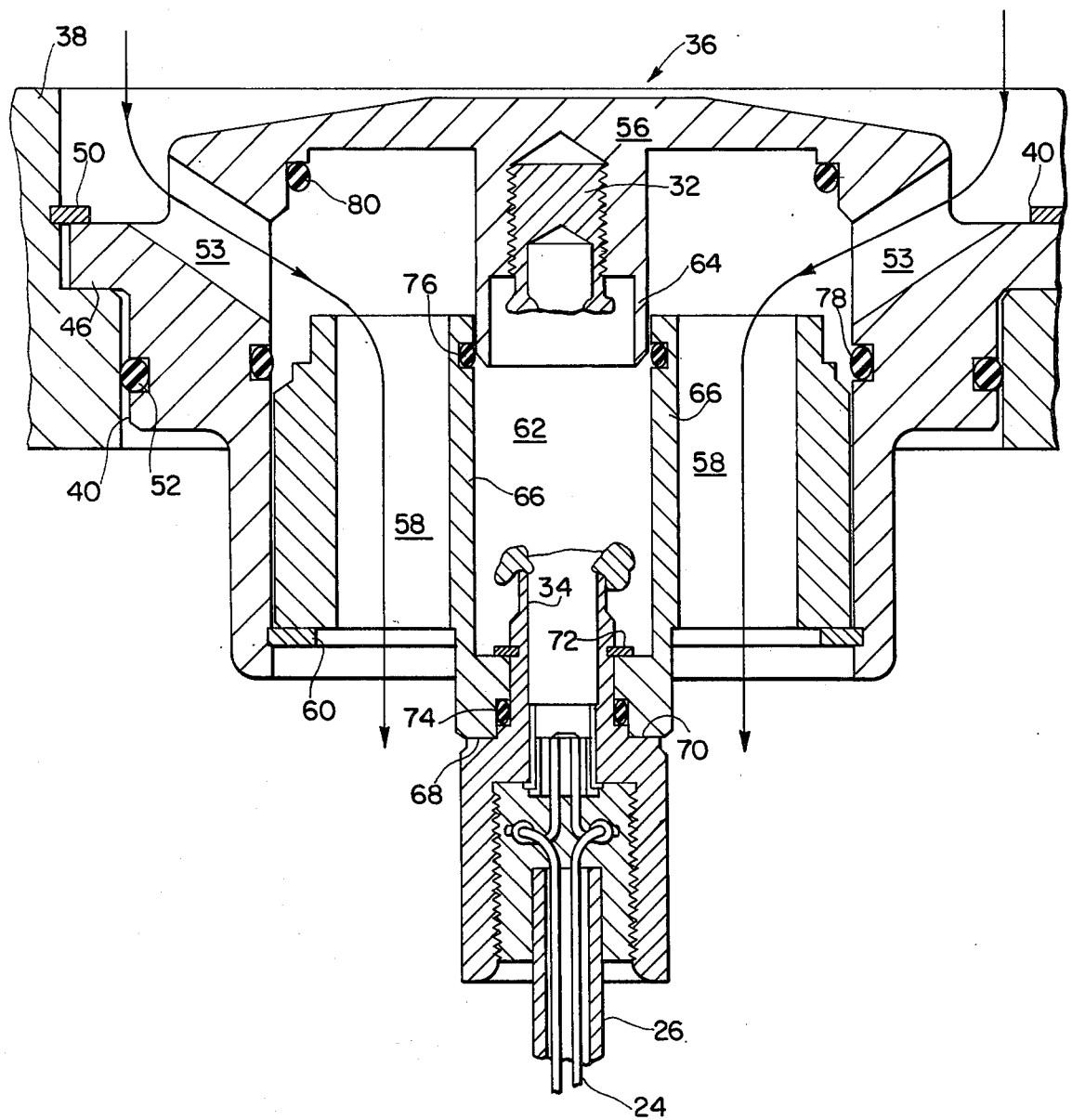
FIG. 3 illustrates the valve of FIG. 2 after actuation.

Upon valve actuation, electrical energy is supplied bolt 10 through leads 24 to the bridge wire 22 causing same to glow red hot and eventually ignite the above-described pyrotechnic mixture incorporated in the bolt 10. The pyrotechnic charge initiated by the electrical means is enabled to quickly (less than a second) burn and/or melt the thin wall 34 of the bolt shank causing the bolt head 32 to be separated from the remainder of the bolt shank of the assembly 10, as shown in FIG. 3.

Inasmuch as stop ring 60 limits the extend to which sliding member 54 is allowed to translate upon valve actuation (see FIG. 3) and since gas pressure seals 74 and 76 maintain the integrity of pressure cavity 62, any high pressure gases developed due to the combustion of the pyrotechnic mixture are confined within cavity 62. Thus, upon valve actuation when the pyrotechnic mixture 12 burns through thin wall 34, the high pressure gas confined within cavity 62 tends to force the sliding member away from the valve housing 36. It is noted that while production of loose parts during actuation is minimized due to the bolt fuzing process, any potential loose parts produced due to any random event are confined within the pressure cavity. Retaining ring 72 holds bolt 10 in a locked position even after valve actuation, as shown in FIG. 3.

Figure 4:
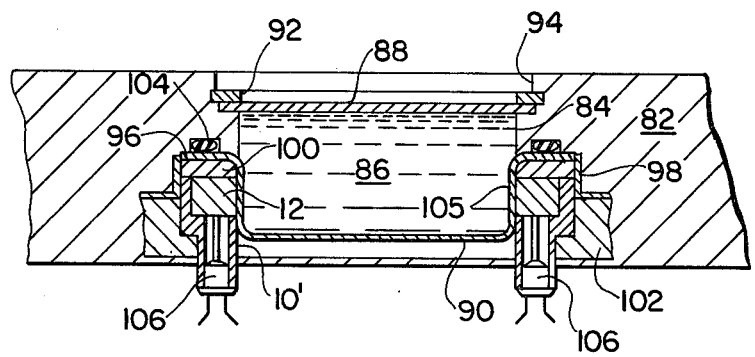
FIG. 4 is an embodiment of the invention used in a silent flooding valve.

FIG. 4 depicts a silent flooding valve in cross section which incorporates a modified embodiment of the present pyrotechnic separation device wherein a wall 82 of a submerged container or vessel to be flooded is provided with a receiving bore 84 holding a quantity of noise dampening fluid 86 such as silicone grease between an annular rubber grease retainer 88 and a fusible diaphragm cup 90. The silicone grease also provides better thermal insulation than the liquid being held out. Of course if the outside medium is air or an inert gas, no insulation would be required. Retainer 88 is secured within bore 84 by a retaining ring 92 fixedly received within a groove formed in a counterbore 94. Diaphragm cup 90 has a flange 96 fitted within counterbore 98. A modified annular pyrotechnic separation device 10' abuts a back-up ring 100 which contacts flange 96. A retaining ring 102, which abuts a lower surface of separation device 10', is threadedly secured in wall 82 and holds the entire assembly in place. Sealing means such as O-ring 104 prevents the loss of fluid 86.

As shown in FIG. 4 pyrotechnic separation device 10' is configured as an annular, upwardly facing container holding a sufficient quantity of the pyrotechnic mixture 12. The mixture is contiguous to the outer peripheral wall of the diaphragm cup 90 at a point called the separation zone 105. Zone 105 extends 360° around the diaphragm cup and is the zone which will be fused by the pyrotechnic mixture. A dual firing circuit characterized by electrical initiator 106 provides the necessary means for remotely actuating the valve.

Upon valve actuation, electrical initiator 106 ignites the pyrotechnic charge in separation device 10' thereafter causing a melting of the peripheral wall of cup 90 in the separation zone. Due to the fusing of the metal of cup 90, the diaphragm cup is incapable of resisting the hydrostatic pressure acting upon the rubber grease retainer 88. The external fluid thus forces the grease and the remainder of cup 90 into the vessel. However, substantially no noise is produced by the valve since the pyrotechnic mixture or charge produces no noise and, where needed, the silicone grease adds a further dampening effect.

Figure 5:
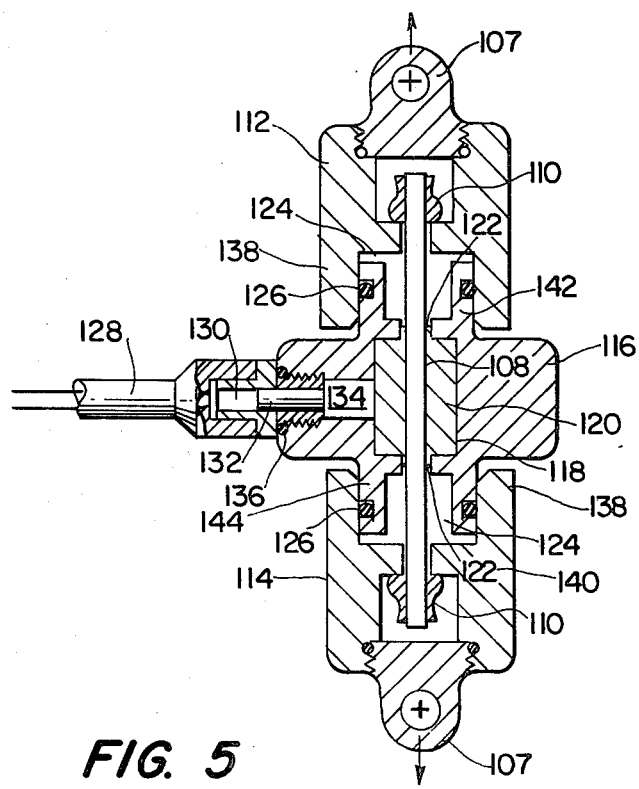
FIG. 5 is another embodiment of the invention used as a silent separation link.

Turning now to FIG. 5, a silent separation link 160 is shown as having a fusible tensile element such as a tie rod 108 fixedly secured as, e.g., by swaged fittings 110 to housings 112 and 114. Attachment means 107 allow link 160 to be used as a separable fastener between two temporarily connected elements (not shown). Interdisposed between housings 112 and 114 is a pyrotechnic charge holder 116 which surrounds rod 108. Contiguously surrounding rod 108 and located within a chamber 118 in holder 116 is a quantity of pyrotechnic material 120. Passages formed by clearances 122 lead from chamber 118 to pressure chambers 124 which are sealed by O-rings 126. Both housing 112 and 114 have cylindrical walls 138 and 140 extending therefrom which interdigitate with cylindrical walls 142 and 144, having a smaller radius, extending from charge holder 116 in order to form pressure chamber 124.

Actuation energy for the link is provided by a firing circuit cable 128 having the prerequisite electrical initiator 130 which communicates with ignition mix 132 and loosely packed pyrotechnic mix 134. Seal 136 prevents combustion gas escapage. Upon actuation, pyrotechnic charge 120 melts tensile element 108 tending to allow the temporarily connected elements to separate. Aiding this separation process is the pressure experienced in pressure chambers 124 produced by the gas generating chemical in the pyrotechnic charge.

The link thus separates without the generation of noise inasmuch as charge 120 creates no shock wave due to detonation. Furthermore, the silent separation link is highly reliable due to the use of dualized pressure chambers 124. The redundancy of the use of the pressure of the combustion gases ensures that the elements desired to be separated are in fact separated.

There has thus been disclosed an improved means which is a combination gas generator and separation device having multifurious uses in which low noise level, no production of loose parts, loss of combustion products can be precluded, high reliability and rapidity of operation are requirements. Another distinct advantage is that the handling, loading and testing of pyrotechnic materials is less hazardous when compared to high explosives and sensitive detonators.

Obviously, numerous modifications and variations of the present invention are possible in the light of the above teachings. It is therefore to be understood that within the scope of the appended claims the invention may be practiced otherwise than as specifically described herein.

What is claimed as new and desired to be secured by Letters Patent of the United States is:

1. A unified gas generator and separation device, comprising:
    an elongate tensile element having first and second ends, said element having a fusible wall defining a central chamber, said central chamber being closed at said first end and communicating with said second end;
    first means located at said first end for connecting said elongate tensile element to a first body;
    second means located at said second end for connecting said elongate tensile element to a second body;
    a pyrotechnic charge including an exothermic mixture and a gas producing chemical retained within said central chamber;
    means communicating with said chamber for igniting said pyrotechnic charge in response to a signal; and
    means attached to said elongate tensile element for closing said second end;
    whereby ignition of said pyrotechnic charge causes both evolution of heat which melts the fusible walls of said tensile element, and evolution of gas which urges said fused tensile element to part.

2. A unified gas generator and separation device as set forth in claim 1 wherein said first means comprises screw threads.

3. A unified gas generator and separation device as set forth in claim 1 wherein said second means comprises a region on said elongated tensile element having increased diameter defining a shoulder facing said first end, a groove spaced toward said first end from said shoulder, and a retaining ring engaging said elongated tensile element in said groove.

4. A unified gas generator and separation device as set forth in claim 1 wherein said means for igniting comprises an electric bridgewire.

5. A silent separation link for releasably securing two separable bodies, comprising:
- a fusible tensile element having first and second ends;
- first means attached to said first end of said tensile element for linking said tensile element with a first body;
- second means attached to said second end of said tensile element for linking said tensile element with a second body;
- a charge holder disposed about said tensile element and interdisposed between both of said first and second means, said holder having a chamber defined about a portion of said tensile element;
- a quantity of gas generating pyrotechnic mixture filling said chamber and being contiguous to said tensile element;
- said charge holder and said first means cooperatively defining a first pressure chamber;
- said charge holder and said second means cooperatively defining a second pressure chamber;
- said charge holder defining passageways communicating between each of said first and second pressure chambers and said chamber; and
- means communicating with said chamber for igniting said mixture in response to a signal;
- whereby ignition of said pyrotechnic mixture causes said fusible tensile element to melt, and gas generated by said pyrotechnic mixture operates in said first and second pressure chambers to cause said first and second means to separate from said charge holder.

6. A silent separation link as defined in claim 5 wherein said tensile element is connected on said first end to said first means by a swaged fitting and on said second end to said second means by a swaged fitting.

7. A silent separation link as defined in claim 5 wherein said means for igniting said mixture comprises a firing circuit cable having an electrical initiator and an array of a readily ignitable ignition mix and loosely packed pyrotechnic mix disposed about said pyrotechnic mixture which is contiguous to said tensile element.

8. A silent separation link as defined in claim 7 wherein said first means comprises a first housing having a cylindrical wall depending therefrom.

9. A silent separation link as defined in claim 8 wherein said charge holder has a first outwardly directed tubular wall interfitting with said cylindrical wall of said first housing, thereby defining said first pressure chamber.

10. A silent separation device as defined in claim 9, further comprising means cooperating with said first housing cylindrical wall and said first tubular wall for sealing said first pressure chamber.

11. A silent separation link as defined in claim 9 wherein said second means comprises a second housing having a cylindrical wall depending therefrom.

12. A silent separation link as defined in claim 11 wherein said charge holder has a second outwardly directed tubular wall interfitting with said cylindrical wall of said second housing, thereby defining said second pressure chamber.

13. A silent separation link as defined in claim 12, further comprising means cooperating with said second housing cylindrical wall and said second tubular wall for sealing said second pressure chamber.

* * * * *